United States Patent [19]

Hollingsworth

[11] Patent Number: 5,035,636
[45] Date of Patent: Jul. 30, 1991

[54] DISC STACK CONNECTOR

[75] Inventor: Elmont E. Hollingsworth, Austin, Tex.

[73] Assignee: Minnesota Mining and Manufacturing Company, St. Paul, Minn.

[21] Appl. No.: 518,140

[22] Filed: May 3, 1990

[51] Int. Cl.⁵ ............................................. H01R 39/02
[52] U.S. Cl. ....................................... 439/215; 439/13
[58] Field of Search ...................... 439/12, 13, 18, 22, 439/29, 31, 207, 210, 212, 215

[56] References Cited

U.S. PATENT DOCUMENTS

| | | | |
|---|---|---|---|
| Re. 31,733 | 11/1984 | Haworth et al. | 339/4 |
| 2,608,634 | 8/1952 | Abbott | 219/19 |
| 2,833,996 | 5/1958 | Wacker et al. | 439/12 |
| 3,841,042 | 10/1974 | Siegal | 52/239 |
| 4,043,626 | 8/1977 | Propst et al. | 339/23 |
| 4,135,775 | 1/1979 | Driscoll | 339/22 |
| 4,203,639 | 5/1980 | VandenHoek et al. | 339/22 |
| 4,214,799 | 7/1980 | Biche | 439/210 X |
| 4,235,495 | 11/1980 | Propst et al. | 339/22 |
| 4,241,965 | 11/1980 | Wilson et al. | 339/4 |
| 4,277,123 | 5/1981 | Haworth et al. | 339/22 |
| 4,295,697 | 10/1981 | Grime | 339/22 |
| 4,367,370 | 1/1983 | Wilson et al. | 174/48 |
| 4,370,008 | 1/1983 | Haworth et al. | 339/4 |
| 4,377,724 | 3/1983 | Wilson | 174/48 |
| 4,437,716 | 3/1984 | Cooper | 339/4 |
| 4,596,098 | 5/1984 | Finkbeiner et al. | 52/220 |
| 4,716,698 | 1/1988 | Wilson et al. | 52/239 |

Primary Examiner—Eugene F. Desmond
Attorney, Agent, or Firm—Gary L. Griswold; Walter N. Kirn; Jack V. Musgrove

[57] ABSTRACT

A wiring system for modular structures, such as prefabricated panels, which utilizes a novel disc stack connector. The connector comprises a stack of alternating conductive and insulative discs which are held in place by a rod traversing a central aperture in each disc. A primary supply cable may be attached to the disc stack connector, allowing parallel connections to secondary cables. Connector heads on the cables have several prongs for engaging the conductive discs. In the preferred embodiment, the conductive discs are smaller than the insulative discs, and one insulative disc is made larger to provide keying with a slot in the connector heads (i.e., the heads are polarized). The connector and cables are located out of sight within the raceways of the prefabricated panels.

19 Claims, 2 Drawing Sheets

DISC STACK CONNECTOR

BACKGROUND OF THE INVENTION

1. Field of the Invention

The present invention generally relates to electrical connectors for wiring systems, and more particularly to the distribution of power to, and the interconnection of, electrical outlets and switches in modular structures, such as prefabricated wall panels.

2. Description of the Prior Art

Construction and design of interior office spaces has become simplified through the use of modular structures, such as prefabricated wall panels. Such panels are comprised of two outer layers defining an internal space which may be left hollow, or filled with thermal insulation, soundproofing material, etc., and often include means for locking adjacent panels together, affording structural integrity to the completed office construction.

In the past, these panels have been provided (integrally or detachably) with electrical devices such as lighting fixtures and standard electrical receptacles. Provision must therefore be made to deliver power to such devices and distribute the electricity to the entire array of interconnected panels. Several variations of wiring systems for modular structures exist, some of which are disclosed in the following patents:

| U. S. Pat. No. | Applicant(s) |
|---|---|
| U. S. Pat. No. 2,608,634 | C. Abbott |
| U. S. Pat. No. 4,135,775 | R. Driscoll |
| U. S. Pat. No. 4,203,639 | VandenHoek et al. |
| U. S. Pat. No. 4,235,495 | Propst et al. |
| U. S. Pat. No. 4,241,965 | Wilson et al. |
| U. S. Pat. No. 4,277,123 | Haworth et al. |
| U. S. Pat. No. 4,295,697 | P. Grime |
| U. S. Pat. No. 4,367,370 | Wilson et al. |
| U. S. Pat. No. 4,370,008 | Haworth et al. |
| U. S. Pat. No. 4,377,724 | Wilson |
| U. S. Pat. No. 4,437,716 | G. Cooper |
| U. S. Pat. No. 4,596,098 | Finkbeiner et al. |
| U. S. Pat. No. 4,716,698 | Wilson et al. |
| U. S. Pat. No. Re 31,733 | Haworth et al. |

These patents present many alternatives in supplying power to prefabricated panels, but they nonetheless suffer significant disadvantages. For example, most of these systems rely on specialized terminal blocks, power tracks, receptacles, etc. which are not compatible with alternative systems. This means that, once a particular system has been selected and installed, the user is thereafter committed to that same system in any future expansions. The cost of these systems is necessarily increased due to the extra expense associated with the manufacture of the specialized components, even though many optional features are never utilized in practice.

Another disadvantage relates to the manner in which prior art systems serially connect the electrical devices to the power supply. This results in a chain of multiple connections leading to any given device, increasing the chances that no power will be delivered at all due to a single faulty connection in the chain. A longer current path also means more power loss. Moreover, in some systems this leads to the wasteful and convoluted overlap of supply cables (see, e.g., U.S. Pat. No. 4,135,775, FIG. 4a). It would be preferable to connect the power circuit in parallel to adjacent panels; such an arrangement has, however, been difficult to accomplish due to the limited number of connections that may be made at prior art terminal blocks.

Finally, prior art wiring systems do not allow sufficient variability in the placement of connectors along the panels. On the contrary, several of the foregoing patents rigidly specify the location of the terminal block, e.g., as being fixedly attached to one end of the panel. This unduly complicates, and limits use of, such systems. It would, therefore, be desirable and advantageous to devise a system for providing electrical connections to modular structures incorporating a connector which is simple to use and install, and which allows more flexibility in placement. The connector should reduce the number of overall junctions in the power supply chain, and yet provide a reliable means for supplying multiple power connections in parallel. It should also facilitate expansion of circuits and easily adapt to alternative wiring systems.

SUMMARY OF THE INVENTION

The foregoing advantages are achieved in an electrical connector having a plurality of conductive disc members, and a plurality of insulative disc members in spaced relation with, and interposed between, the conductive disc members. The preferred embodiment comprises five or more circular metal discs and six or more insulative discs separating and surrounding the conductive discs. The insulators are also circular and have a larger diameter than the conductors, minimizing the possibility of accidental connections which could result in short circuits or shock hazards.

The discs are disposed generally parallel to one another, and are united by a longitudinal member which extends through a central aperture in each disc. The central member has a free end and a base, the base including an integral mounting plate which may conveniently be mounted at any point along a raceway or column in a prefabricated wall panel. Means are provided at the free end to secure the discs to the longitudinal member. By providing 360° access to a central power tap, a multitude of cables may be connected in parallel, each having a narrow connector head which engages a plurality of the discs. Such a construction combines flexibility and efficiency in the distribution of power to electrical devices incorporated into the panel architecture.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
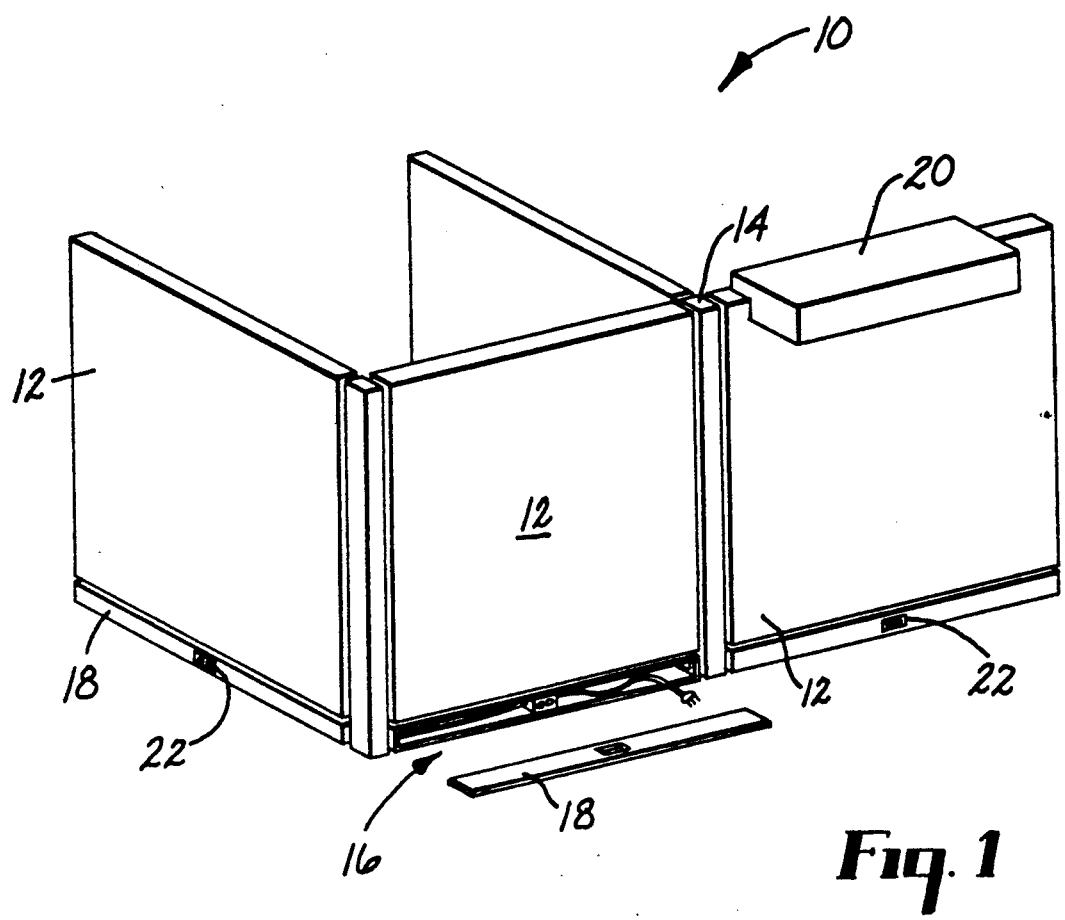
FIG. 1 is a perspective view of a modular structure comprising a plurality of interconnected prefabricated panels, a raceway of one panel being exposed.

With reference now to the figures, and in particular with reference to FIG. 1, there is depicted a modular structure 10 comprised of a plurality of interconnected, prefabricated panels 12 forming walls or partitions which subdivide a room or office space. Panels 12 are attached to one another by means of connecting posts or columns 14, and include raceway structures 16 which typically have detachable closures 18. Modular structure 10 further includes electrical devices such as a lighting fixture 20 and outlets 22, e.g., standard 3-pole receptacles.

Panels 12 are known in the art, and generally comprise two outer layers defining an internal space which may be left hollow, or filled with thermal insulation, soundproofing material, etc. Panels 12 may be of any desired dimensions (i.e., height and length) depending upon the type of partitioning to be effected. Attachment means are provided within columns 14, such as hooks 24 formed integrally with the side walls of column 14, which engage slots in the end walls of panels 12 (see FIG. 2). Alternative attachment means are discussed in detail in U.S. Pat. Nos. 3,841,042; 4,235,495; 4,241,965; 4,370,008; 4,437,716; 4,596,098; and 4,716,698.

Figure 2:
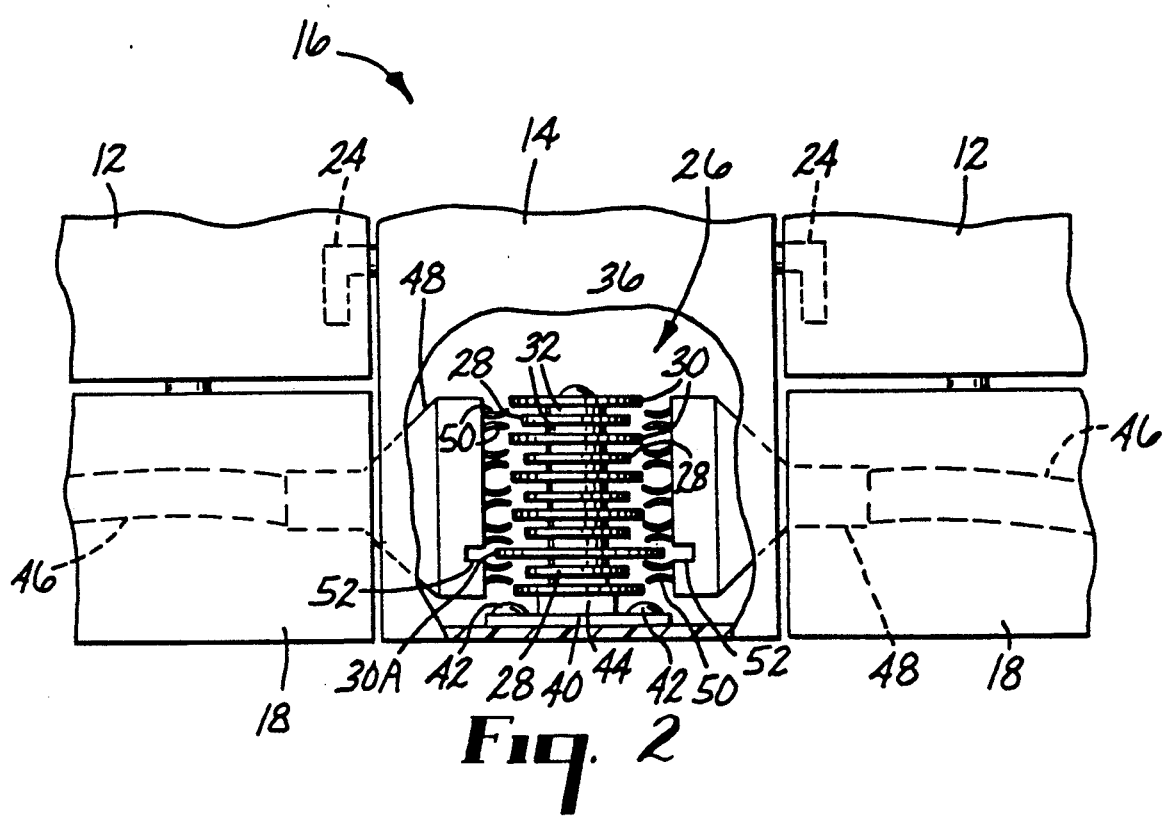
FIG. 2 is a front elevational view of the lower ends of two adjacent panels, with a cutout revealing the disc stack connector of the present invention.

Referring now to FIG. 2, electrical power is typically delivered to the panel arrangement by a wiring system traversing raceways 16. In the present invention, the wiring system employs a disc stack connector 26 to deliver power to the various electrical devices incorporated into modular structure 10. Disc stack connector 26 is generally comprised of a plurality of conductive elements 28, which are separated by a plurality of insulative elements 30. In other words, the insulative discs 30 are in spaced relation with, and interposed between, the conductive discs 28. As used herein, the term "disc" refers to any generally circular, planar member, although polygonal plates would also be included, provided they allow for essentially continuous access along a curve of at least 270°, and preferably 360°.

Figure 3:
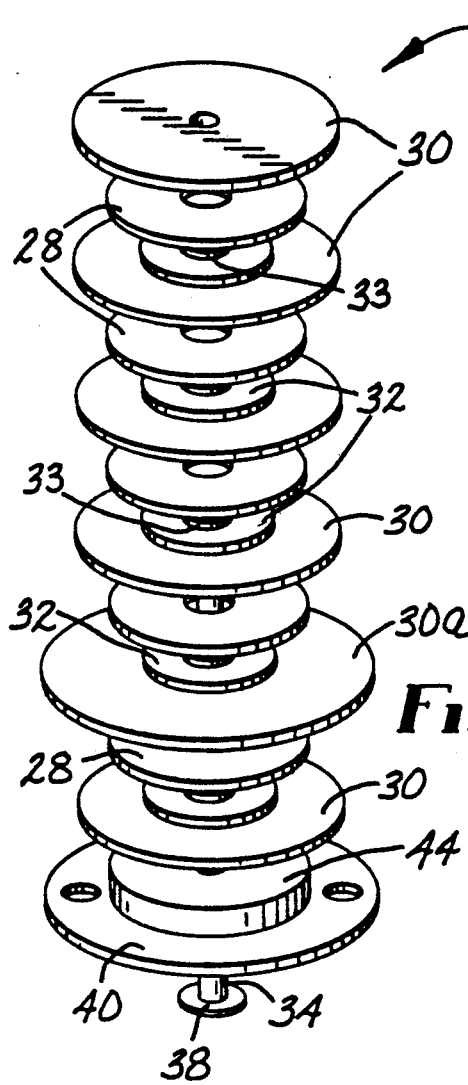
FIG. 3 is an exploded perspective view of the disc stack connector of FIG. 2.

Discs 28 and 30 are disposed generally parallel to one another, and are united by a rod member 34 which extends longitudinally through a central aperture in each disc (see FIG. 3). Rod member 34 may take the form of a bolt, screw, spring pin, etc., although it is preferably a (steel) rivet rod having a free end 36 and a base 38. Base 38 is attached to a mounting plate 40 which may be mounted at any point along raceway 16 or within column 14, using fastening means such as screws 42. Mounting plate 40 further includes a standoff 44. Means are also provided at free end 36 to secure the discs to rod member 34. If a rivet rod is used for member 34, then the securing means is a rivet cap. If a bolt were used instead, then the securing means might comprise a locknut. Other means may be devised for supporting the discs in the stack construction.

In the preferred embodiment, disc stack connector 26 comprises five conductive discs and six insulative discs. Five conductive discs are provided inasmuch as the power supply for a panel structure commonly employs five separate conductive paths: one for ground, one for a neutral line, and three "hot" lines for 3-phase voltage. Of course, more or less discs could be used, depending upon the intended application. In this regard, the number of conductive (and insulative) discs could be varied, even after installation, provided that detachable means are used to secure the discs to rod member 34.

Discs 28 may be formed from any conductive (metallic) material, preferably a tin-plated copper alloy with a thickness of about one millimeter. Discs 30 may be formed from any insulative material, preferably an engineering thermoplastic polymer such as polyester. Insulators 30 should have a larger diameter than conductors 28 (i.e., conductors 28 are recessed), to reduce shock hazards and the chances of accidental connections which could result in a short circuit. A typical outer diameter for insulative discs 30 is about 25 millimeters.

The central portions of insulators 30 are thickened on each side to form spacers 32 which create a clearance space around conductive discs 28 (e.g., a clearance of about 5 millimeters on either side of each conductive disc). It will further be appreciated that a short circuit might occur between adjacent conductive discs if rod member 34 is also conductive. In order to avoid such an event, each conductor 28 is preferably isolated from rod member 34 by an annular rim or bushing 33 integral with spacer 32 on insulator 30 which extends into the aperture in conductive disc 28. In such an embodiment, the apertures in conductive discs 28 are accordingly larger than the apertures in insulative discs 30. Alternatively, rod member 34 may be constructed of an insulative material.

Two cables 46 are also illustrated in FIG. 2, having connector heads 48 proximate disc stack connector 26. Each connector head 48 includes five pairs of prongs 50 for engaging the periphery of conductive discs 28, prongs 50 also being connected to five separate conductors within cables 46. The distal ends of cables 46 may be provided with similar connector heads. Connector heads 48 and/or disc stack connector 26 may optionally be mechanically polarized to preclude miswiring. As shown in FIG. 2, a keying (insulative) disc 30a has a diameter greater than the diameter of the remaining insulative discs 30, and each connector head 48 has a corresponding slot 52. In this manner, connector head 48 may be operatively attached to disc stack connector 26 only if properly oriented. Latching means may also be provided to secure connector heads 48 to disc stack connector 26.

As those skilled in the art will appreciate, cables 46 may be wired to provide different operating circuits for adjacent panels. For example, most electrical devices which are attached to or incorporated in modular structure 10 operate on 120 volt power, meaning that only one of the three hot lines is necessary. Therefore, different connector heads 48 (each having only three pairs of prongs 50) could tap into the three different hot lines by selective placement of the prongs on the connector heads. This minimizes the chances of an overload on any one circuit. Similar concepts are disclosed in U.S. Pat. Nos. 4,203,639; 4,367,370; and 4,377,724.

Figure 4:
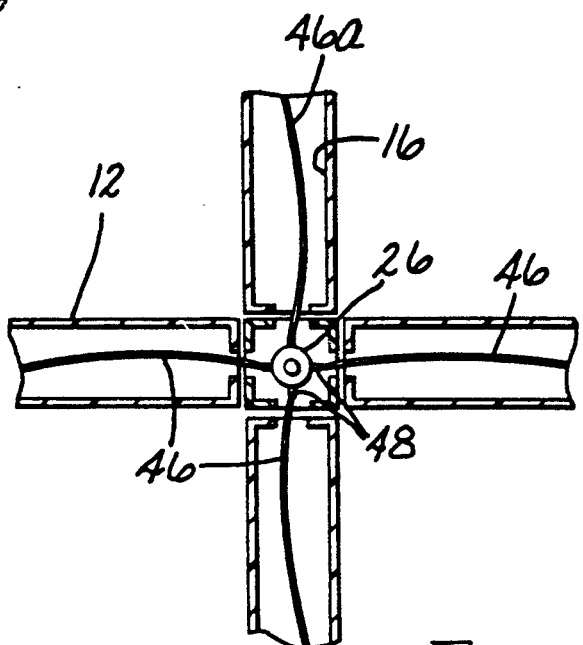
FIG. 4 is a cross-sectional plan view of the raceways of four intersecting panels, also illustrating the corresponding cable connections.

Turning now to FIG. 4, one end of a primary supply cable 46a is connected (directly or indirectly) to a power source (not shown), with the second end being connected to disc stack connector 26 at a four-way panel intersection. Disc stack connector 26, in turn, delivers the power to the other three cables 46 attached thereto. In FIG. 4, it can be seen that connector heads 48 are relatively narrow, allowing connection of several such connector heads to disc stack connector 26. Although cables 46 are shown extending through raceways 16, they may also be placed within columns 14, e.g., to deliver power to light fixture 20.

Figure 5:
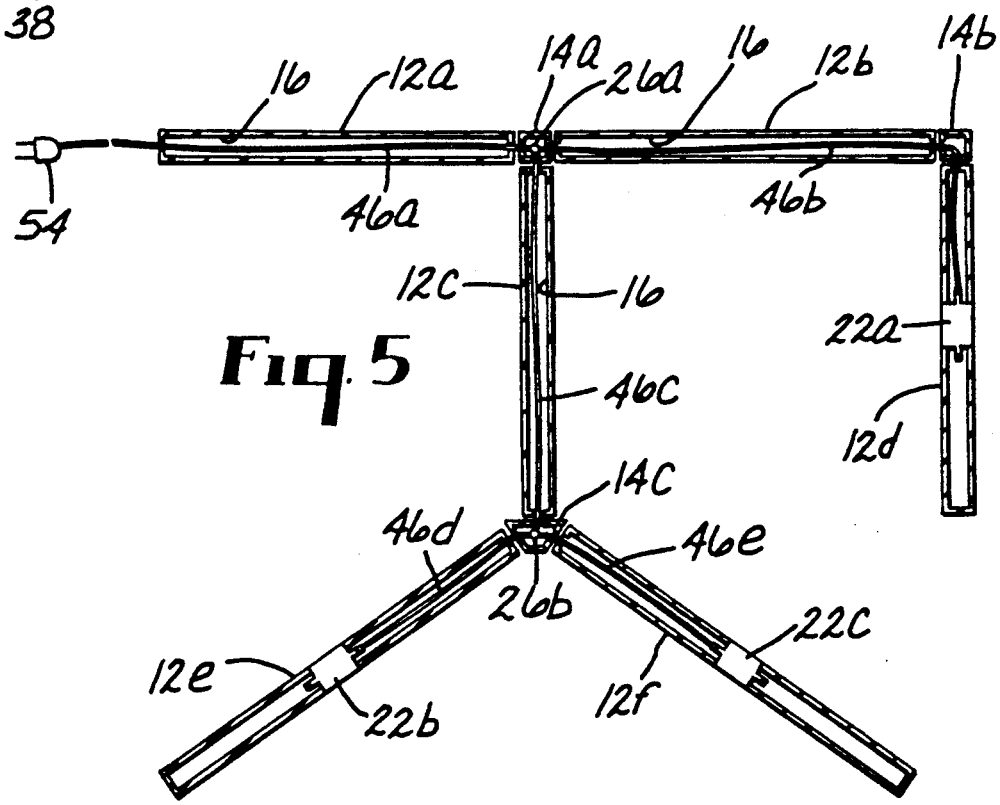
FIG. 5 is a cross-sectional plan view of the raceways of a panel arrangement having "T", "L" and "Y" intersections.

The improved flexibility and efficiency in the use of the present invention may best be understood with reference to FIG. 5, to which attention is now directed. In an exemplary setting, primary cable 46a, having plug means 54 for attachment to the external power source, enters raceway 16 of the first panel 12a. No receptacles have been provided in panel 12a, so cable 46a passes therethrough to the first disc stack connector 26a in column 14a, a "T" intersection. Disc stack connector 14a also receives secondary cables 46b and 46c which pass through panels 12b and 12c, respectively. Cable 46b continues through another column 14b into panel 12d (an "L" intersection), and delivers power to a terminal block 22a. Since panel 12d is a "dead end," no additional connector is needed in column 14b.

Returning to cable 46c, that cable conveys the power further to another disc stack connector 26b in column 14c. There, panels 12c, 12e and 12f form a "Y" intersection. Connector 26b accordingly distributes power to cables 46d and 46e which are respectively connected to terminal blocks 22b and 22c. The cables may be provided in a variety of standard lengths, or could be assembled as needed. In the latter case, cables 46 may be the flat ribbon type, and connector heads 48 may conveniently comprise a clam-shell type body having a plurality of metallic elements therein which pierce the ribbon cable and contact the internal conductors. Connectors of this construction are conventionally known as insulation displacement connectors.

The modular structure shown in FIG. 5 could easily be modified as required. Additional cables could be attached to connectors 26a and 26b, including cables which travel upwardly to distribute power to lighting fixtures. Columns 14a–14c may further accommodate power supply cables which are provided within the ceiling. Finally, if the specifications of the modular structure require a large number of connections at each connector 26, then the discs (both insulative and conductive) would be enlarged, thereby increasing the circumference and the number of connector heads which may be attached.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, while the present invention is considerably useful in supplying power to prefabricated wall panels, it clearly has broader application in providing electrical connections to any type of wiring network. It is therefore contemplated that the appended claims will cover such modifications that fall within the true scope of the invention.

I claim:

1. A device for providing multiple electrical connections, comprising:
   a plurality of conductive disc members;
   a plurality of insulative disc members interposed between said conductive disc members;
   means for supporting said conductive and insulative disc members, thereby forming a disc stack; and
   means for providing a clearance space on each side of said conductive disc members.

2. The device of claim 1 wherein said conductive and insulative disc members each have a central aperture, and said supporting means further comprises:
   a rod member having a base and a free end, extending longitudinally through said apertures in each of said conductive and insulative disc members; and
   means for securing said conductive and insulative disc members to said rod member.

3. The device of claim 2 further comprising means for electrically isolating said rod member from each of said conductive disc members.

4. The device of claim 2 wherein each said insulative disc member further includes an integral spacer portion located near the center of each said insulative disc member for providing a clearance space between the periphery of each said insulative disc member and the periphery of an adjacent one of said conductive disc members.

5. The device of claim 4 wherein said apertures in said conductive disc members are larger than said apertures in said insulative disc members, and each of said insulative disc members further includes a bushing extending from said spacer portion into said aperture of an adjacent one of said conductive disc members, said bushings thereby electrically isolating said conductive disc members from said rod member.

6. The device of claim 1 further comprising means for mechanically polarizing said disc stack.

7. The device of claim 6 wherein:
   said insulative disc members are generally circular, each having a first diameter; and
   said polarizing means comprises a keying disc member having a diameter greater than said first diameter.

8. The device of claim 1 further comprising means for mounting said disc stack to a surface.

9. The device of claim 1 further comprising a plurality of cables, each said cable including a connector head having multiple prong means for separately engaging said conductive disc members.

10. A disc stack connector for providing electrical connections in parallel, comprising:
    a plurality of conductive discs each having a central aperture;
    a plurality of insulative discs each having a central aperture, said insulative discs being in spaced relation with, and interposed between, said conductive discs, and each of said insulative discs further including an integral spacer located near the center of each said insulative disc for providing a clearance space between the periphery of each said insulative disc and the periphery of an adjacent one of said conductive discs;
    a rod member having a base and a free end, extending longitudinally through said apertures in each of said conductive and insulative discs;
    means for securing said conductive and insulative discs to said rod member;
    means for mechanically polarizing the disc stack connector; and
    a mounting plate attached to said base of said rod member.

11. The disc stack connector of claim 10 further comprising means for electrically isolating each said conductive disc from said rod member.

12. The device of claim 11 wherein said apertures in said conductive discs are larger than said apertures in said insulative discs, and each of said insulative discs further includes a bushing extending from said spacer into said aperture of an adjacent one of said conductive discs, said bushings thereby electrically isolating said conductive discs from said rod member.

13. The disc stack connector of claim 10 wherein each said conductive disc is accessible at least 270° along its periphery.

14. The disc stack connector of claim 10 further comprising a plurality of cables, each said cable including a connector head having prong means for engaging said conductive discs.

15. The device of claim 10 wherein:

said insulative discs are generally circular, each having a common diameter; and said polarizing means comprises an insulative keying disc having a diameter greater than said common diameter.

16. A wiring system for supplying power to a modular structure, comprising:

a plurality of prefabricated panels each having two ends and a raceway therebetween, at least one end of each of said panels being disposed adjacent an end of another one of said panels;

means for attaching said adjacent panels;

at least one terminal block located within one of said raceways;

at least one disc stack connector located within one of said raceways, comprising:

five generally circular, metallic discs each having a central aperture, six generally circular, polymeric discs each having a central aperture, said polymeric discs being in spaced relation with, and interposed between, said metallic discs, whereby said polymeric discs successively alternate with said metallic discs, each said polymeric disc further including an integral spacer located near the center of each said polymeric disc for providing a clearance space between the periphery of each said polymeric disc and the periphery of an adjacent one of said metallic discs, a rivet rod having a base and a free end, extending longitudinally through said apertures in each of said metallic and polymeric discs, means for securing said metallic and polymeric discs to said rod member, means for electrically isolating said rivet rod from said metallic discs, and a mounting plate attached to said base of said rod member, said mounting plate being fastened to a floor of said raceway;

a primary supply cable having five conductors therein for connection to an external power source, terminating in a first connector head having five prongs which are connected to said conductors, said prongs also engaging said metallic discs of said disc stack connector; and a secondary cable having five conductors therein and having distal and proximate ends, said proximate end terminating in a second connector head having five prongs which are electrically connected to said conductors in said secondary cable, said prongs further engaging said metallic discs of said disc stack connector, and said distal end of said secondary cable being connected to said terminal block, thereby providing electrical continuity between said primary supply cable and said terminal block.

17. The wiring system of claim 16 wherein said metallic and polymeric discs are generally parallel, and said metallic discs allow essentially 360° access along their peripheries.

18. The wiring system of claim 16 wherein:

one of said six polymeric discs is a keying disc having a diameter greater than the diameter of the other polymeric discs; and said first and second connector heads each have a slot therein for engaging said keying disc.

19. A device for providing multiple electrical connections, comprising:

a plurality of conductive disc members;

a plurality of insulative disc members interposed between said conductive disc members, said insulative disc members being generally circular and having a first diameter;

means for supporting said conductive and insulative disc members, thereby forming a disc stack; and means for mechanically polarizing said disc stack, said polarizing means including a keying disc member having a diameter greater than said first diameter.

* * * * *